(12) United States Patent
Jordan et al.

(10) Patent No.: US 8,132,042 B2
(45) Date of Patent: Mar. 6, 2012

(54) METHOD AND DEVICE FOR EXCHANGING DATA ON THE BASIS OF THE OPC COMMUNICATIONS PROTOCOL BETWEEN REDUNDANT PROCESS AUTOMATION COMPONENTS

(75) Inventors: Carsten Jordan, Erlangen (DE); Dieter Kleyer, Herzogenaurach (DE); Lothar Schmidt, Eggolsheim (DE); Axel Zimmer, Weisendorf (DE)

(73) Assignee: Siemens Aktiengesellschaft, Munich (DE)

( * ) Notice: Subject to any disclaimer, the term of this patent is extended or adjusted under 35 U.S.C. 154(b) by 14 days.

(21) Appl. No.: 12/227,740

(22) PCT Filed: Feb. 1, 2007

(86) PCT No.: PCT/EP2007/050962
§ 371 (c)(1),
(2), (4) Date: May 5, 2009

(87) PCT Pub. No.: WO2007/137880
PCT Pub. Date: Dec. 6, 2007

(65) Prior Publication Data
US 2010/0005336 A1 Jan. 7, 2010

(30) Foreign Application Priority Data
May 26, 2006 (EP) ..................... 06010923

(51) Int. Cl.
*G06F 11/00* (2006.01)
(52) U.S. Cl. ........................................ 714/4.1
(58) Field of Classification Search ............. 714/4.1
See application file for complete search history.

(56) References Cited

U.S. PATENT DOCUMENTS

| | | | |
|---|---|---|---|
| 2004/0006624 A1* | 1/2004 | Hawkinson et al. | 709/227 |
| 2005/0028024 A1* | 2/2005 | Kataoka et al. | 714/4 |
| 2005/0033802 A1 | 2/2005 | Andersson | |
| 2005/0097165 A1* | 5/2005 | Lahtinen et al. | 709/203 |
| 2006/0056285 A1 | 3/2006 | Jones | |
| 2007/0198724 A1* | 8/2007 | Hawkinson et al. | 709/226 |
| 2008/0114872 A1* | 5/2008 | Fisher et al. | 709/224 |
| 2008/0161958 A1* | 7/2008 | Davidson et al. | 700/109 |
| 2008/0294771 A1* | 11/2008 | Hermes et al. | 709/224 |

OTHER PUBLICATIONS

Hybrid Applications Paper (http://www.opcwebclient.com/Support/Documents/Hybrid_Applications_Paper/hybrid_applications_paper.html) 2006.*
Myron Hecht et al., "OFTT: A Fault Tolerance Middleware Toolkit for Process Monitoring and Control Windows NT Applications", pp. 225-230, XP10504333.

* cited by examiner

*Primary Examiner* — Bryce Bonzo

(57) ABSTRACT

The invention relates to a method and a device for exchanging data on the basis of the OPC communications protocol, wherein at least one OPC-ready server is connected parallel to a master OPC server. An OPC client is connected to the master OPC server over a first communications link and to at least one OPC-ready server via at least one second communications link. The OPC client exchanges data over the first communications link and the master OPC server, and over at least the second communications link and at least one OPC-ready server with automatic devices, and evaluates the data transmitted by the master OPC server and at least one OCT-ready server. In the event of failure, the master OPC server is at least partially switched over from the OPC client to at least one OPC-ready server such that the program continues to run smoothly in the same place.

11 Claims, 3 Drawing Sheets

METHOD AND DEVICE FOR EXCHANGING DATA ON THE BASIS OF THE OPC COMMUNICATIONS PROTOCOL BETWEEN REDUNDANT PROCESS AUTOMATION COMPONENTS

CROSS REFERENCE TO RELATED APPLICATIONS

This application is the US National Stage of International Application No. PCT/EP2007/050962, filed Feb. 1, 2007 and claims the benefit thereof. The International Application claims the benefits of European application No. 06010923.8 filed May 26, 2006, both of the applications are incorporated by reference herein in their entirety.

FIELD OF INVENTION

The invention relates to a method for exchanging data on the basis of the OPC communications protocol, wherein at least one standby OPC server is connected in parallel to a master OPC server. The invention also relates to a device designed to carry out the method according to the invention.

BACKGROUND OF THE INVENTION

In this arrangement, data exchange or more specifically the exchange of process variables takes place on the basis of OPC. OPC is a standardized communications protocol which has been specified by the OPC Foundation (www.opcfoundation.org). OPC stands for OLE ("Object linking and embedding") for Process Control and is an open standard.

Process automation systems are normally subdivided into three hierarchically arranged automation levels. In the upper automation level, which is often termed the management layer or supervision layer, personal computers are mainly used. The tasks at this level are, for example, operator control, monitoring, display, archiving and optimization of the process operations. In the control layer below this level, because of their extremely high availability, so-called programmable logic controllers (PLCs) are preferably used which, as they mainly only ever control one sub-process, are also known as distributed automation units. The PLCs acquire the process measurements acquired by sensors via corresponding connections, the sensors acquiring measurements directly from the relevant sub-process, e.g. from a turbine or electric generator, in what is known as the field layer. The process measurements acquired by the sensors can also be forwarded by microcontrollers disposed in the field layer to the relevant PLC or PLCs or can be constituted by the microcontrollers themselves. In the same way, the PLCs can address the actuators disposed in the field layer via control signals and possibly via the microcontrollers in order to influence the sub-processes, e.g. the turbine.

Automation devices such as programmable logic controllers of the kind present in the control layer, and personal computers of the kind present e.g. in the management layer of a large power plant, communicate with and among one another mainly by means of proprietary communications protocols. These communications protocols mainly differ not only between different manufacturers, but often also between devices of the same manufacturer. This makes communication with other automation devices impossible without costly measures. Thus it is possible only at great expense to upgrade, modify or modernize an existing automated plant of this kind using other manufacturers' automation devices or software programs.

In order to standardize the communications interfaces between the different devices and software programs and thereby standardize communication, the OPC interface has been developed and agreed as a standard in the process automation sector. Nowadays OPC-based communication is mainly used between the management layer and the control layer. OPC-based communication of this kind can also be used between a business/office level and the management layer or within the same layers. Data or more specifically process variables are exchanged or transmitted via OPC connections.

The data exchange of an OPC communication generally takes place via n active connections, an OPC-based communication requiring ever higher communication availability with correspondingly shorter downtimes or failure frequencies. For this reason, a reliable OPC connection is also desirable for an OPC-based communication.

In order to make an OPC connection more reliable, it is known from the prior art, for example, to duplicate the hardware, which means that two complete hardware connections are provided separately from one another. In the event of a fault, switching then takes place to the fault-free hardware connection. However, this solution does not take operator control into account. As a result, after a switchover the displays (plant displays and/or operating displays) must be re-selected. In critical plant states, valuable time is lost, so that dangerous operator control breaks can occur. A high-availability OPC connection cannot therefore be implemented solely by connecting OPC client-server connections i.e. OPC links in parallel, as continuous operator control cannot be guaranteed in the event of OPC link failure. Thus operating displays of the HMIs (Human-Machine Interfaces) frequently disposed in the control layer may be disturbed by the switchover and therefore have to be updated in a time-consuming manner by re-interrogation. Operator inputs and control commands may likewise be lost. Particularly in the case of time-critical operations, this is a considerable disadvantage which can result in dangerous plant states. As a result, multiple archives must also be maintained, as complete acquisition and archiving cannot be guaranteed during the switchover phase. Another disadvantage is that process states and process alarms must be updated in the switchover phase or during re-integration. Events occurring in the meantime (e.g. changes and alarms) may be lost as a result.

In order to achieve such continuous and uninterrupted operator control and monitoring of the automation level from the management layer even in the event of computer failure, exclusively proprietary solutions have hitherto been used which. e.g. in the case of modifications, allow only little scope for selecting new devices or must be adapted at very great expense.

SUMMARY OF INVENTION

The object of the invention is to specify a method and a device for exchanging data on the basis of the OPC communications protocol which enable complications, particularly downtimes, caused by switching operations to be prevented.

This object is achieved according to the invention by the method mentioned in the introduction wherein an OPC client is connected to the master OPC server via a first communications connection and to the at least one standby OPC server via an at least second communications connection, and wherein the OPC client exchanges data with automation devices via the first communications connection and the master OPC server and via the at least second communications connection and the at least one standby OPC server and evaluates the data coming from the master OPC server and the at least one standby OPC server, and wherein, in the event of a fault, the OPC client switches over at least partially from the master OPC server to the at least one standby OPC server such that program execution is continued hitlessly at the same place.

According to the invention, an OPC client is not, as is currently the practice for OPC communication, operated or installed on a separate computer for each OPC server—whose main tasks consist of acquiring the data or process values from the field layers i.e. controller levels and providing this data in OPC format, and also determining and conditioning status and fault information—but parallel operated or connected i.e. redundantly designed OPC servers comprising a master OPC server and at least one standby OPC server are connected to a common OPC client via separate communications connections. The OPC client is designed to detect a malfunction from the data received. If the OPC client has detected a malfunction, the OPC client switches over at least partially from the active master OPC server via which, during fault-free operation e.g. of the power plant, data and process variables for open- or closed-loop control of the power plant are exchanged, to the standby OPC server. This can be a complete switchover, i.e. the standby OPC server completely assumes the open-/closed-loop control tasks of the master OPC server, as is the case in the event of very serious malfunction. In the event of a less serious malfunction, i.e. if, for example, in the case of a redundantly designed field layer component comprising a master component and a standby component, the master component has failed, the switchover can be only partial so that open-/closed-loop control of the standby component is effected via the standby OPC server, while open-/closed-loop control of the remaining components continues to be effected via the master OPC server. Thus the overall availability of an automation solution can be inventively increased.

In contrast to known solutions, the inventive connection of the standby OPC server and the master OPC server to a common OPC client allows no-break switching. Operator control is not interrupted and operator inputs are not lost and do not therefore need to be repeated. Archives are consistently updated and therefore have no gaps. An explicit update is unnecessary. In addition, the "operating" of the power plant proceeds uninterruptedly even in the event of a fault. Separate selection of the plant and operating displays is not required, but the plant and operating display selection made prior to the malfunction is automatically transferred and no-break transfer of all the alarms, reports or status indications is ensured. Independently of any hardware problem, the plant operator is able to detect fault states in the plant even in critical situations and control the plant quickly and safely, thereby avoiding malfunctions and extremely costly plant downtimes.

In an advantageous embodiment of the method according to the invention, the master OPC server and the at least one standby OPC server exchange data with the automation devices via redundantly designed connection links, the master OPC server and the at least one standby OPC server having access to identical or the same automation devices and exchange data therewith. Preferably the automation devices, e.g. controllers, are likewise designed redundantly in the form of a standby controller and a master controller, wherein redundancy management is carried out autonomously by the controllers and the master OPC server is connected to the master controllers and the standby OPC server is connected to the standby controllers via the respective redundantly designed connection links. If an active master controller fails or exhibits a malfunction, open-/closed-loop control is assumed by the standby controller and the exchange of data or more specifically process variables takes place via the standby OPC server to the OPC client. In addition to the redundant design of the controllers at control level, the I/O level can also be redundantly designed in a similar manner. Overall, the total availability of an automation solution is significantly increased by using the two OPC servers in conjunction with a switching facility that is "granular" in terms of operator control.

In another advantageous development of the method according to the invention, the OPC client is of redundant design comprising a master OPC client and at least one standby OPC client wherein, in the event of a fault, switchover takes place between the master OPC client and the at least one standby OPC client such that program execution is continued hitlessly at the same place, the master OPC client and the at least one standby OPC client being recognizable to the master OPC server and the at least one standby OPC server only as the OPC client.

By inventively providing redundancy of the OPC client in this way, the latter is also protected in addition to the OPC servers which recognize it only as one OPC client. Here the redundantly designed OPC client is preferably implemented according to the single system image principle or according to the single application image principle or rather employs these principles. Single system image means that the entire memory or the entire memory image of the master OPC client is also available on the standby OPC client, while in the case of the single application image the application is identical, but system components can be completely different. In the event of a fault, switchover is effected directly to the standby OPC client such that program execution is continued at the same place as in the master OPC client and the operator control operation can be continued in the same step. Altogether, even in the event of a failure or malfunction of the OPC client, no-break switching, as expounded above, is thus implemented in an inventive manner.

In a particularly practical development of the method according to the invention, the OPC client switches from the master OPC server to the at least one standby OPC server at least partially depending on the fault level.

For selective redundancy monitoring of this kind, only individual process values or data which is reported as defective in the master OPC server go from the standby OPC server into the process image of the OPC client. The selection of the process values or data, i.e. the decision as to whether a value from the master OPC server or from the standby OPC server is used, takes place on the basis of a fault level, preferably in the form of a so-called OPC quality code. The OPC client always makes a new decision for each individual process value or item of data, the value with the "better" quality being selected, e.g. according to the following "decision formula": GOOD>UNCERTAIN>BAD.

The invention also relates to a device for carrying out the method according to the invention wherein the at least one standby OPC server is connected in parallel to a master OPC server, and wherein an OPC client is connected to the master OPC server via a first communications connection and to the at least one standby OPC server via an at least second communications connection, and wherein the OPC client is designed to exchange data with automation devices via the first communications connection and the master OPC server and via the at least second communications connection and the at least one standby OPC server and to evaluate the data coming from the master OPC server and the at least one standby OPC server, and wherein, in the event of a fault, the OPC client is also designed to switch over at least partially from the master OPC server to the at least one standby OPC server such that program execution is continued hitlessly at the same place.

In an advantageous development, the OPC client is of redundant design comprising a master OPC client and at least one standby OPC client wherein, in the event of a fault, the OPC client is designed to switch between the master OPC client and the at least one standby OPC client in such a way that program execution is continued hitlessly at the same place, the master OPC client and the at least one standby OPC client being recognizable to the master OPC server and the at least one standby OPC server only as the OPC client. It is preferable here, on the one hand, that the redundantly designed OPC client is implemented on a fault-tolerant computer. Alternatively, the master OPC client is implemented on a fault-tolerant computer and the at least one standby OPC client is implemented on at least one other fault-tolerant computer.

BRIEF DESCRIPTION OF THE DRAWINGS

Exemplary embodiments of devices for exchanging data on the basis of the OPC communications protocol will be explained in greater detail below with reference to the accompanying drawings in which.

DETAILED DESCRIPTION OF INVENTION

Figure 1:
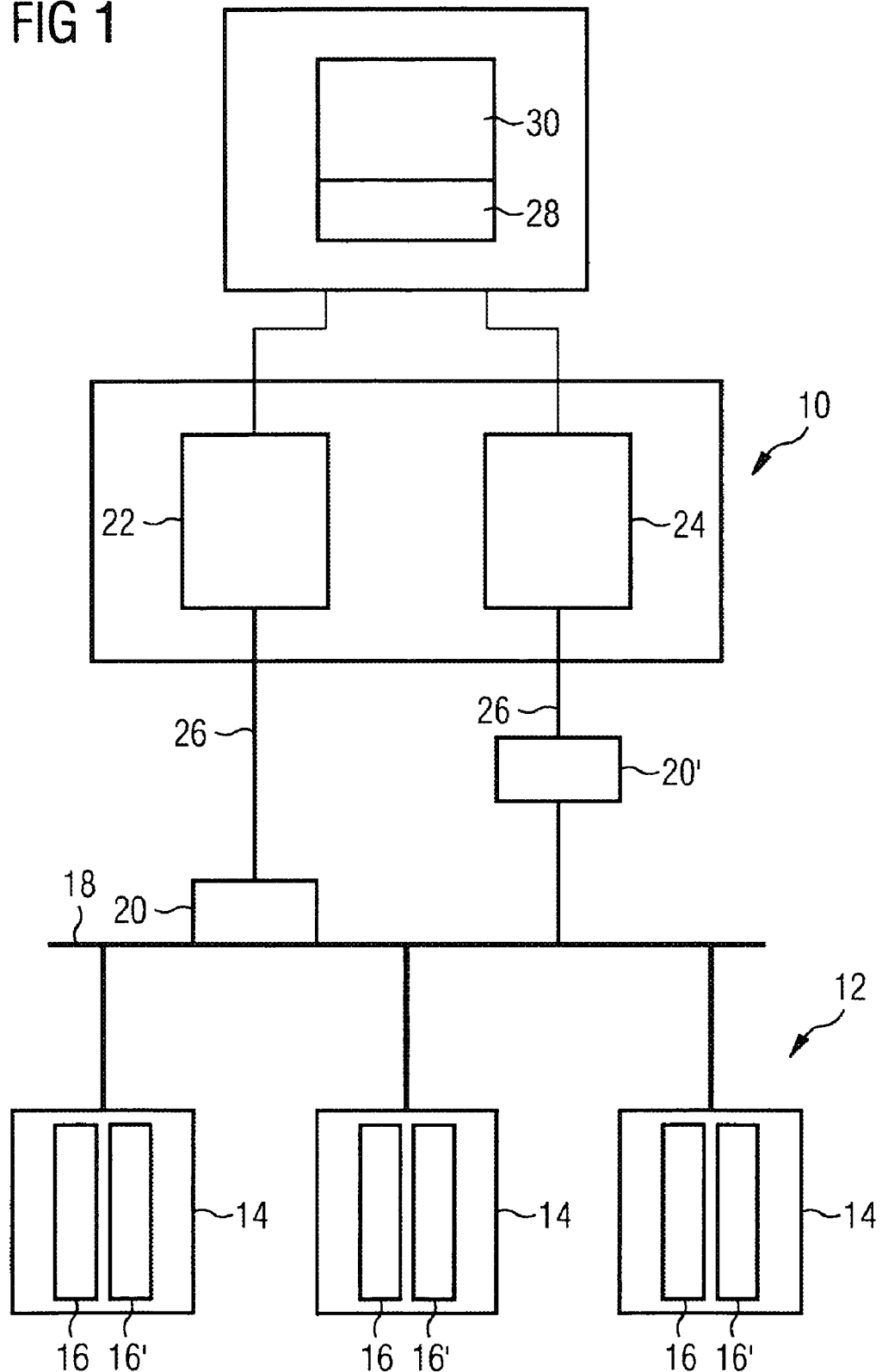
FIG. 1 schematically illustrates a device according to the invention for exchanging data on the basis of the OPC communications protocol, FIG. 2 schematically illustrates a device known from the prior art for exchanging data on the basis of the OPC communications protocol, FIG. 3 schematically illustrates another device according to the invention for exchanging data on the basis of the OPC communications protocol, and FIG. 4 schematically illustrates individual components of a power plant automation system.

FIG. 1 shows an inventive device 10 for exchanging data on the basis of the OPC communications protocol. The lower half of the figure first shows a typical automation level or more specifically field layer 12 comprising three individual automation servers 1 which assume different open-loop or closed-loop control functions during power plant operation. Each of the three automation servers 14 is redundantly designed by means of two modules in the form of two controllers, namely a master controller 16 and a standby controller 16'. Data or more specifically process variables of the individual automation servers 14 are transmitted via a likewise redundantly designed plant bus 18 (the redundancy is symbolized in FIG. 1 by the broad line thickness) across two OPC controller interfaces 20, 20' to a master OPC server 22 and a standby OPC server 24 respectively of a separate server hardware. One of the buses of the redundantly designed plant bus 18 establishes a connection to the master OPC server 22 via the OPC controller interface 20; the other bus of the redundantly designed plant bus 18 establishes a connection to the standby OPC server 24 via the other OPC controller interface 20'.

The data or process variables transmitted to the two OPC servers 22, 24 are converted into OPC format by the two OPC servers 22, 24 and transmitted to a common OPC client 28 via two separate communications connections 26. The OPC client 28 controls and monitors the two OPC servers 22, 24 and is installed as an access level on a fault-tolerant HMI (Human-Machine Interface) server 30. The OPC client 28 is redundantly designed in accordance with the single application image principle.

In the event of a disturbance, i.e. when a fault or malfunction is reported to the OPC client 28, the latter switches from the master OPC server 22, via which open-loop or closed-loop control of a power plant component is effected during problem-free power plant operation, to the standby OPC server 24. Particularly in the event of an extensive malfunction or major failure, this can be a complete switchover so that all the open-/closed-loop control operations are effected via the standby OPC server 24. However, depending on the extent of the fault, the switchover can be only partial. This is particularly the case if one of the master controllers 16 reports a malfunction to the OPC client 28. In this case the OPC client 28 switches over to the standby OPC server 24 such that, for now on, open-/closed-loop control of the standby controller 16' provided for realizing the redundancy is effected via said standby OPC server 24. Only open-/closed-loop control of the standby controller 16' takes place via the standby OPC server 24, while open-/closed-loop control of the remaining master controllers 16 continues to take place via the master OPC server 22. This provides an inventive means of increasing the overall availability of an automation solution. Through the redundant design of the OPC client 28, the latter is also protected in addition to the OPC servers 22, 24 which recognize it only as one OPC client 28.

In addition, in contrast to known solutions, the switchover—both from the master OPC server 22 to the standby OPC server 24 and from the master OPC client to the standby OPC client (not shown)—is effected in a no-break manner in accordance with the invention so that operator control is not interrupted and operator inputs are not lost.

Figure 2:
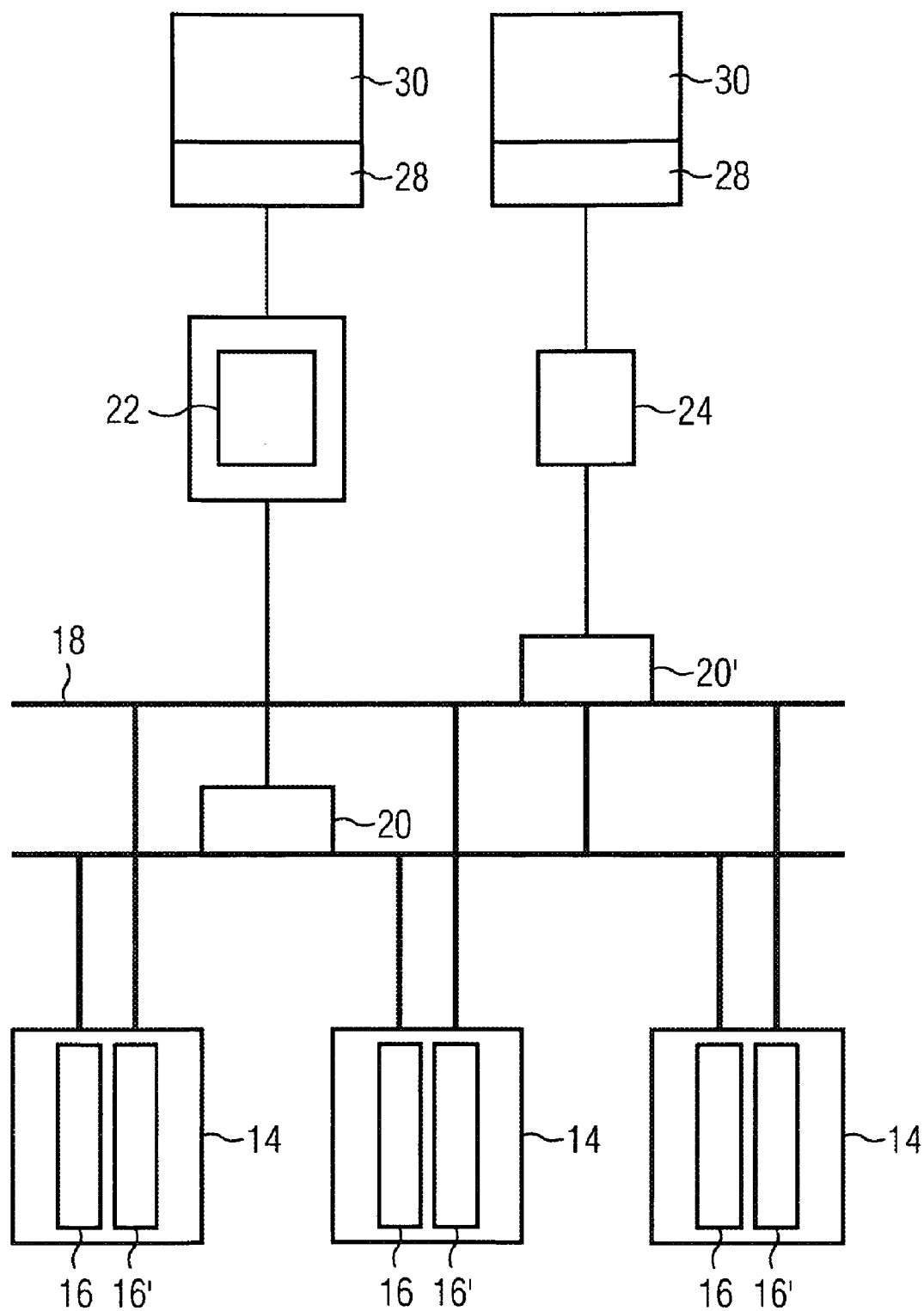

For comparison with the inventive device shown in FIG. 1, FIG. 2 schematically illustrates a device known from the prior art for exchanging data on the basis of the OPC communications protocol. Once again the individual controllers 16, 16' together with the plant bus 18 are redundantly designed. Here, however, the standby OPC server 24 and the master OPC server 22 and are not connected via a common OPC client, as is the case according to the invention. A hitless switchover between OPC servers 22, 24 separated in this way cannot therefore take place.

Figure 3:
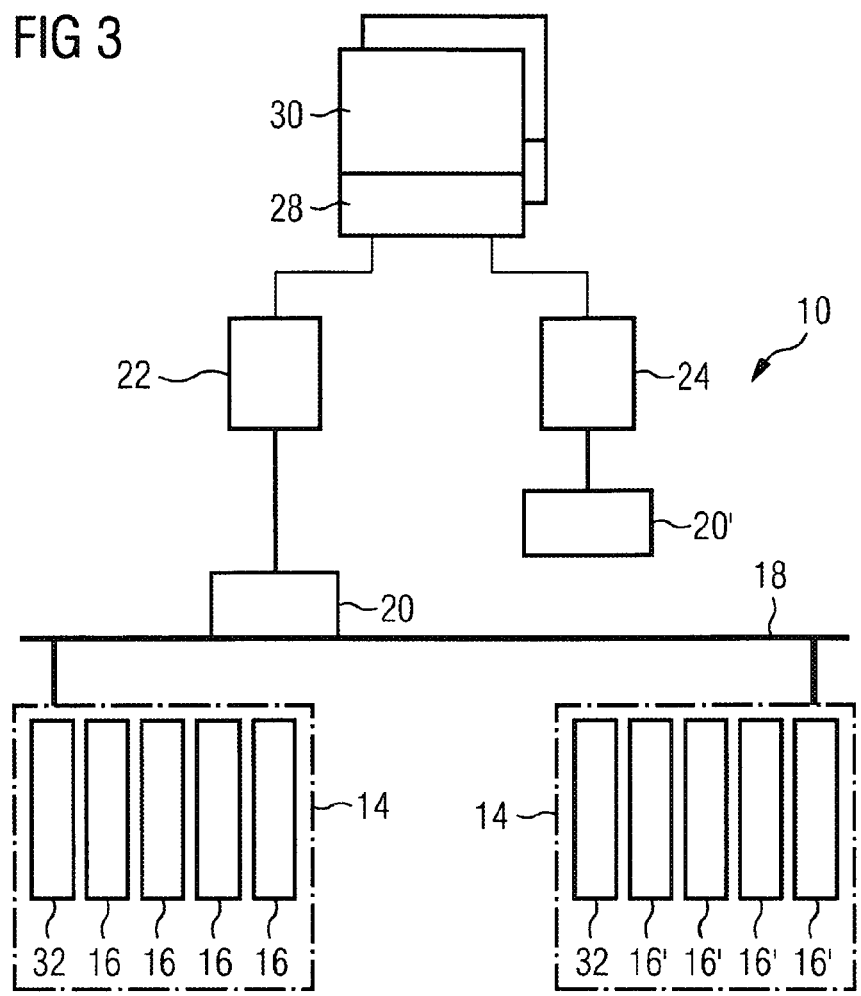

FIG. 3 schematically illustrates another device 10 according to the invention for exchanging data on the basis of the OPC communications protocol. Two automation servers 14 each provided with a number of modules in the form of controllers 16, 16' and each having a CPU 32, 32' are redundantly designed, i.e. the individual controllers 16, 16', the CPUs 32, 32' and also the I/O level (not shown) are redundantly designed, the controllers 16' and the CPUs 32' each constituting the corresponding standby controllers and standby CPUs respectively. The plant bus 18 is accordingly likewise of redundant design. Once again the OPC client 28 is also installed on a fault-tolerant HMI (Human-Machine Interface) server 30 and redundantly designed, as symbolized by the graphics.

Figure 4:
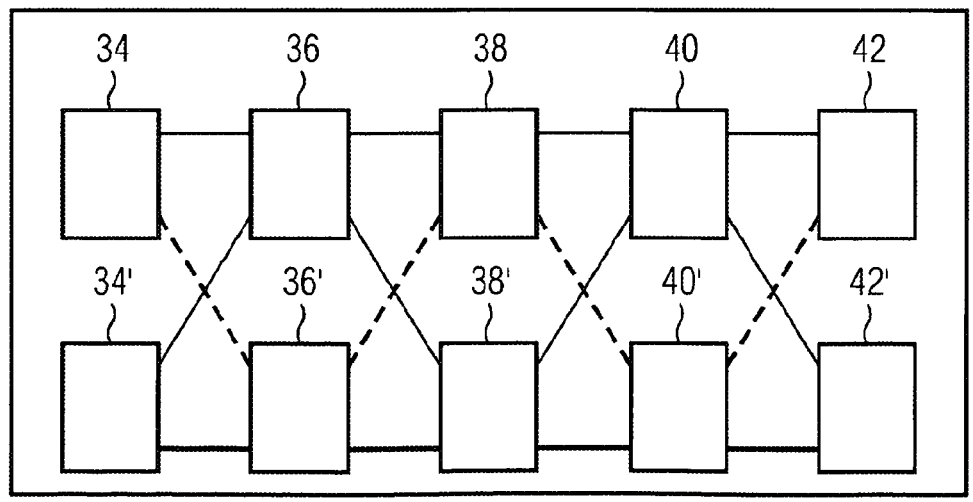

FIG. 4 schematically illustrates individual components of a power plant automation system, showing in the top row, from left to right, in schematic form a master HMI CPU 34, a master OPC server 36, a master plant bus interface 38, a master automation system 40 and a master I/O module 42. The bottom row shows below the individual components corresponding standby components 34', 36', 38', 40' and 42' for the redundant implementation. The representation in FIG. 4 schematically illustrates how the availability of the power plant automation system is increased by partial switchover to individual standby components 34', 36', 38', 40' and 42'. Via the dashed lines, e.g. the defective components 36 and 40 can be masked out, while the intact components 34, 38 and 42 of the "parallel link" can be used.

The invention claimed is:

1. A method for exchanging data based on OPC communications protocol, comprising:
providing at least one standby OPC server connected in parallel to a master OPC server, wherein an OPC client is connected to the master OPC server via a first communications connection and to the at least one standby OPC server via an at least second communications connection;
exchanging data between the OPC client and automation devices via
the first communications connection and the master OPC server, and
the at least second communications connection and the at least one standby OPC server;
evaluating, by the OPC client, the data coming from the master OPC server and the at least one standby OPC server; and
switching over, by the OPC client, from the master OPC server to the at least one standby OPC server such that program execution is continued hitlessly at the same place, the switching over in response to the evaluating.

2. The method as claimed in claim 1, wherein the master OPC server and the at least one standby OPC server exchange data with the automation devices via redundantly designed connecting links, wherein the master OPC server and the at least one standby OPC server have access to the identical or the same automation devices and exchange data therewith.

3. The method as claimed in claim 2, wherein the OPC client is redundantly designed, comprising a master OPC client and at least one standby OPC client, and in the event of a fault, switchover takes place between the master OPC client and the at least one standby OPC client such that program execution is continued hitlessly at the same place, the master OPC client and the at least one standby OPC client recognizable to the master OPC server and the at least one standby OPC server only as the OPC client.

4. The method as claimed in claim 3, wherein the redundantly designed OPC client
is redundantly implemented, or
operates according to the single system image principle or according to the single application image principle.

5. The method as claimed in claim 4, wherein the OPC client is switched at least partially from the master OPC server to the at least one standby OPC server depending on the fault level.

6. A device for exchanging data on the basis of the OPC communications protocol, comprising:
at least one standby OPC server connected in parallel to a master OPC server; and
an OPC client connected to the master OPC server via a first communications connection and to the at least one standby OPC server via an at least second communications connection, wherein
the OPC client exchanges data with automation devices via the first communications connection and the master OPC server and via the at least second communications connection and the at least one standby OPC server and evaluates the data coming from master OPC server and the at least one standby OPC server, and, in the event of a fault, also switches at least partially from the master OPC server to the at least one standby OPC server such that program execution is continued hitlessly at the same place.

7. The device as claimed in claim 6, wherein the OPC client comprises a master OPC client and at least one standby OPC client, and in the event of a fault, the OPC client is designed to switch between the master OPC client and the at least one standby OPC client such that program execution is continued hitlessly at the same place, the master OPC client and the at least one standby OPC client are recognizable to the master OPC server and the at least one standby OPC server only as the OPC client.

8. The device as claimed in claim 7, wherein the redundantly designed OPC client is redundantly implemented or operates according to the single system image principle or according to the single application image principle.

9. The device as claimed in claim 8, wherein the redundantly designed OPC client is implemented on a fault-tolerant computer.

10. The device as claimed in claim 8, wherein the master OPC client is implemented on a fault-tolerant computer and the at least one standby OPC client is implemented on at least one other fault-tolerant computer.

11. The device as claimed in claim 10, wherein the OPC client is designed to switch at least partially from the master OPC server to the at least one standby OPC server depending on the fault level.

* * * * *